United States Patent
Balachandran et al.

(10) Patent No.: US 9,116,166 B2
(45) Date of Patent: Aug. 25, 2015

(54) LINEARITY ENHANCEMENT OF CAPACITIVE TRANSDUCERS BY AUTO-CALIBRATION USING ON-CHIP NEUTRALIZATION CAPACITORS AND LINEAR ACTUATION

(75) Inventors: Ganesh Balachandran, Sunnyvale, CA (US); Vladimir Petkov, Mountain View, CA (US)

(73) Assignee: Robert Bosch GmbH, Stuttgart, DE (US)

( * ) Notice: Subject to any disclaimer, the term of this patent is extended or adjusted under 35 U.S.C. 154(b) by 440 days.

(21) Appl. No.: 13/551,408

(22) Filed: Jul. 17, 2012

(65) Prior Publication Data

US 2013/0152663 A1 Jun. 20, 2013

Related U.S. Application Data

(63) Continuation of application No. 13/235,334, filed on Sep. 16, 2011.

(51) Int. Cl.

| G01P 21/00 | (2006.01) |
|---|---|
| G01L 25/00 | (2006.01) |
| G01L 27/00 | (2006.01) |
| G01D 18/00 | (2006.01) |

(52) U.S. Cl.
CPC .............. *G01P 21/00* (2013.01); *G01L 25/00* (2013.01); *G01L 27/002* (2013.01); *G01D 18/006* (2013.01)

(58) Field of Classification Search
CPC ........................................................ G01P 21/00

USPC ................ 73/1.38, 510, 511, 514.29, 514.32, 73/514.36, 514.38, 488, 503, 514.01, 73/514.16, 724, 780; 324/58, 661, 679, 324/680, 686

See application file for complete search history.

(56) References Cited

U.S. PATENT DOCUMENTS

| 5,211,051 | A | * | 5/1993 | Kaiser et al. ................... 73/1.38 |
|---|---|---|---|---|
| 6,035,694 | A | * | 3/2000 | Dupuie et al. ................. 73/1.38 |
| 6,109,114 | A | * | 8/2000 | Hartley et al. ................. 73/774 |
| 7,430,909 | B2 | * | 10/2008 | Adams et al. ................... 73/510 |
| 7,712,366 | B2 | * | 5/2010 | Beyeler et al. ............. 73/514.32 |
| 8,056,415 | B2 | * | 11/2011 | McNeil et al. ............. 73/514.32 |
| 8,823,398 | B2 | * | 9/2014 | Balachandran et al. ...... 324/679 |

\* cited by examiner

*Primary Examiner* — Hezron E Williams
*Assistant Examiner* — Hoang Nguyen
(74) *Attorney, Agent, or Firm* — Maginot Moore & Beck LLP

(57) ABSTRACT

A system and method are disclosed for automatically calibrating capacitive transducers to neutralize feed-through capacitance using linear actuation. The method includes starting with an initial neutralization capacitance, applying no electrostatic force and two known electrostatic forces to a proof mass of the transducer, recording the transducer output changes due to the applied forces; and determining how to revise neutralization capacitance based on the changes. The method can use a binary search to find a final neutralization capacitance providing the best linearity. The method can include comparing the final linearity to a threshold linearity. The electrostatic forces can be applied using a charge control method where the electrostatic force is a linear function of the actuation duration. The linear actuation can be used for continuous self-test of capacitive sensors.

19 Claims, 9 Drawing Sheets

LINEARITY ENHANCEMENT OF CAPACITIVE TRANSDUCERS BY AUTO-CALIBRATION USING ON-CHIP NEUTRALIZATION CAPACITORS AND LINEAR ACTUATION

CROSS REFERENCE TO RELATED APPLICATIONS

This application is a continuation of U.S. patent application Ser. No. 13/235,334, filed on Sep. 16, 2011, entitled "Linearity Enhancement of Capacitive Transducers by Auto-Calibration Using On-Chip Neutralization Capacitors and Linear Actuation," which is incorporated herein by reference.

BACKGROUND OF THE INVENTION

This patent relates to capacitive transducers, and more particularly to techniques for reducing or eliminating nonlinearities due to feed-through capacitances, and automatic calibration procedures to improve the linearity of capacitive bridges and accelerometers by cancelling parasitic feed-through capacitances.

Transducers convert a general physical quantity (for example, acceleration, pressure, etc.) to quantities that can be processed by electronic circuits. In particular, capacitive transducers produce a change of capacitance, corresponding to the magnitude of the measured input signal. Readout circuits for capacitive transducers transform the capacitance change produced by the transducer to an electrical signal. In the process, the circuits apply voltage waveforms to the transducer electrodes.

A capacitive accelerometer, a capacitive transducer for measuring acceleration, can be designed such that displacement of a set of capacitive plates is proportional to acceleration. Then acceleration can be measured using electronics by measuring the difference in the set of capacitors. A capacitive accelerometer can include a mechanical sensing element and a readout circuit. FIG. 1 illustrates an exemplary embodiment of a mechanical sensing element 100 for a capacitive accelerometer. In this embodiment, the mechanical sensing element 100 includes a proof mass 102 suspended between a first spring 104 and a second spring 106, a first electrode 110 and a second electrode 112. A proximal end of the mass 102 is coupled to the first spring 104 and a distal end of the mass 102 is coupled to the second spring 106. The first spring 104 has two ends; a first end coupled to the proximal end of the mass 102 and a second end coupled to a substrate. The second spring 106 has two ends; a first end coupled to the distal end of the mass 102 and a second end coupled to the substrate. A common electrode M is coupled to the mass 102 and moves with the mass 102 relative to the substrate. The first and second electrodes 110, 112 are stationary relative to the substrate. In this embodiment a positive reference voltage $V_S$ is applied to the first electrode 110 and the negative reference voltage $-V_S$ is applied to the second electrode 112. A first variable capacitor $C_1$ is formed between the first electrode 110 and the common electrode M, and a second variable capacitor $C_2$ is formed between the second electrode 112 and the common electrode M.

In this embodiment, when the system is at rest, there is a substantially equal nominal gap $g_0$ between the first electrode 110 and the common electrode M and between the second electrode 112 and the common electrode M, creating substantially equal capacitances in the first variable capacitor $C_1$ and the second variable capacitor $C_2$. An input acceleration moves the mass 102 relative to the substrate which varies the gaps between the electrodes and varies the capacitance of the variable capacitors $C_1$, $C_2$. Acceleration in the direction of arrow 120 deflects the mass 102 a distance $\Delta x$ that is proportional to the input acceleration. This movement of the mass 102 increases the distance between the first electrode 110 and the common electrode M to $g_0+\Delta x$, and decreases the distance between the second electrode 112 and the common electrode M to $g_0-\Delta x$, which changes the capacitance of capacitors $C_1$ and $C_2$. The capacitance C of variable capacitors $C_1$ and $C_2$ can be determined by:

$$C_{1/2} = \frac{\varepsilon_0 A}{g_0 \pm \Delta x} \quad (1)$$

where $\varepsilon_0$ is dielectric permittivity, A is the area of the capacitive plates (which extend into the paper), $g_0$ is the nominal gap and $\Delta x$ is the displacement due to the acceleration. The readout circuit determines the value of $\Delta x$ based on the capacitance change in capacitors $C_1$ and $C_2$.

Accelerometers are often implemented in harsh vibration-ridden environments, for example automotive or industrial environments. In these environments, it is desirable to have accelerometers with good linearity, low drift performance and large full scale range. Self-balanced accelerometers are usually chosen for these applications. In self-balanced accelerometers, the capacitance C is proportional to 1/d, where d is the distance between the capacitive plates; and the measured output voltage $V_0$ is proportional to $(C_1-C_2)/(C_1+C_2)$. Combining these two relationships provides:

$$V_O \propto \frac{C_1 - C_2}{C_1 + C_2} = \frac{\frac{1}{d1} - \frac{1}{d2}}{\frac{1}{d1} + \frac{1}{d2}} = \frac{d2 - d1}{d2 + d1} = \frac{x}{d0} \quad (2)$$

where x is the displacement value, d0 is the zero displacement value, d1=d0−x is the distance between the plates of capacitor $C_1$, and d2=d0+x is the distance between the plates of capacitor $C_2$. Equation (2) shows that in the ideal case the output voltage $V_0$ of the self-balanced accelerometer is a linear function of the displacement x. Unfortunately, in actual implementations, there are sources of non-linearity not taken into account in Eq. (2).

Though there are several ways to build self-balanced accelerometers to obtain a reading that is proportional to the displacement of the proof mass, to achieve a highly linear accelerometer it is desirable to have a topology that results in zero residual force upon the application of sensor excitation voltages. There are two main sources of non-linearity in self-balanced accelerometers: feed-through capacitance, and mismatch between the two sensor cores. The dominant source is feed-through capacitance, and it is present in both single ended (using only one core) and differential (using two cores) topologies.

Feed-through capacitance (Cft) is any fixed capacitance between the proof mass and the sense electrodes. The feed-through capacitances Cft arise due to parasitics in the sensor element and due to capacitance between the bond wires. FIG. 2 illustrates the feed-through capacitance in a capacitive core 200, an example of which is shown in FIG. 1. The capacitive core 200 includes a first capacitor C1 between a first sense electrode 202 and a proof mass 204, and a second capacitor C2 between a second sense electrode 206 and the proof mass 204. The capacitive core 200 also includes unwanted feed-through capacitances Cft between the proof mass 204 and each of the sense electrodes 202, 206. Re-deriving Eq. (2) taking into account the feed-through capacitances Cft provides:

$$Vo \propto: \frac{C_1 - C_2}{C_1 + C_2 + 2C_{ft}} = \frac{\frac{1}{d1} - \frac{1}{d2}}{\frac{1}{d1} + \frac{1}{d2} + \frac{2C_{ft}}{A}} = \frac{d2 - d1}{d2 + d1 + \frac{2C_{ft}}{C0}\frac{d2*d1}{d0}} = \frac{x}{d0 + \frac{C_{ft}}{C0}\frac{(d0^2 - x^2)}{d0}} \quad (3)$$

which introduces a non-linear term $x^2$ due to the feed-through capacitance.

Nonlinearity due to mismatch in sensor cores occurs in fully differential accelerometers which use two sensor cores. A differential topology can provide better robustness to electromagnetic signals and other stray disturbances. The sensor cores are often two separate elements with the proof masses not connected mechanically. This is often done to save cost since mechanical connection of the proof masses of the two cores with electrical isolation can be expensive in terms of processing. Under this condition the offsets of the sensor cores can be in opposite directions which causes non-linearity because of remnant electrostatic forces as well as the fact that capacitance is inversely proportional to displacement.

A comparison of the magnitudes of the non-linearities due to feed-through capacitance and core mismatch shows that feed-through capacitance is the dominant source of non-linearity. The non-linearity due to a core mismatch of 5 pF (+/−5% core mismatch) is 0.016%. However, the non-linearity due to 50 fF (100 times smaller than 5 pF) remnant feed-through capacitance is 0.43%, which is almost 30 times greater than the core mismatch non-linearity. Even a 10 fF remnant feed-through capacitance causes a non-linearity of 0.087%.

It would be desirable to reduce or eliminate the nonlinearity due to feed-through capacitances. It would also be desirable to have an automatic calibration procedure to improve the linearity of capacitive bridges and accelerometers by cancelling the parasitic feed-through capacitances.

SUMMARY OF THE INVENTION

A method is disclosed for automatically calibrating a capacitive transducer to neutralize feed-through capacitance starting from an initial value for a neutralization capacitance. The method includes applying no electrostatic force to a proof mass of the capacitive transducer and recording a base output value while no electrostatic force is applied; applying an electrostatic force F0 to the proof mass and recording a first change in the output value of the capacitive transducer between the base output value and a first output value when the electrostatic force F0 is applied; applying an electrostatic force n*F0 to the proof mass and recording a second change in the output value of the capacitive transducer between the first output value and a second output value when the electrostatic force n*F0 is applied to the proof mass; increasing, decreasing or maintaining the neutralization capacitance based on the recorded first and second changes in the output value of the capacitive transducer; and repeating the method until a final vale for the neutralization capacitance is reached. The electrostatic force F0 is a fraction of the electrostatic force n*F0.

The increasing, decreasing or maintaining step can include decreasing the neutralization capacitance when the first change in the output value is greater than the second change in the output value, and increasing the neutralization capacitance when the first change in the output value is less than the second change in the output value. The method can include performing a binary search between a minimum neutralization capacitance and a maximum neutralization capacitance. The method can also include comparing the linearity of the final vale for the neutralization capacitance to a linearity threshold.

The electrostatic forces can be applied to the proof mass using a charge control method. Applying an electrostatic force F0 to the proof mass can include actuating the proof mass for a period t, and applying an electrostatic force n*F0 to the proof mass can include actuating the proof mass for a period n*t. The capacitive transducer can include first and second variable capacitors, and applying an electrostatic force can include a first actuation phase for resetting the capacitive transducer by removing charge from the first and second variable capacitors, a second actuation phase for applying the electrostatic actuation force to the capacitive transducer where the electrostatic force is a function of the duration of the second actuation phase, a first measurement phase for reading out the output signal of the capacitive transducer due to the electrostatic actuation force the first measurement phase following the second actuation phase, and a second measurement phase for applying no electrostatic actuation force to the first and second variable capacitors. In this situation the system progresses through the phases in the following order: first actuation phase, then second actuation phase, then first measurement phase, then second measurement phase. The second variable capacitor of the capacitive transducer can be short circuited during the second actuation phase.

An apparatus for linearly actuating a sensor using a charge control method is disclosed. The apparatus includes a capacitive core, an operational amplifier, a conductive path and an actuation source. The capacitive core includes a first sense node, a second sense node and a proof mass, where a first variable capacitor is formed between the first sense node and the proof mass, and a second variable capacitor is formed between the second sense node and the proof mass. The operational amplifier includes an inverting input, a non-inverting input, an output, and a first feedback path coupling the output to the inverting input. The capacitive core is in the first feedback path. The conductive path short circuits the second variable capacitor. The actuation source places an actuation force on the proof mass of the capacitive core for a duty cycle, and the actuation force is a linear function of the duty cycle. The actuation source can include a voltage source and an input capacitor switchably coupling the voltage source to the inverting input of the amplifier; where the non-inverting input of the amplifier is coupled to ground. The apparatus can also include a second feedback path in parallel with the first feedback path. During a first phase, the voltage source can charge the input capacitor and the second feedback path can short circuit the entire capacitive core; and during a second phase, the voltage source can be disconnected from the input capacitor and the second feedback path can be open circuited so that the charge from the input capacitor is dumped onto the first variable capacitor of the capacitive core placing an actuation force on the proof mass.

A continuous self-test method is disclosed for a capacitive sensor of a transducer system. The capacitive sensor includes a first sense node, a second sense node and a proof mass, such that a first variable capacitor is formed between the first sense node and the proof mass, and a second variable capacitor is formed between the second sense node and the proof mass. The method includes continuously using linear actuation to apply an electrostatic force to the proof mass of the capacitive sensor, measuring the displacement of the proof mass caused by the electrostatic force, reading an output signal of the transducer system due to the displacement of the proof mass, determining whether the output signal is within an operational range, and assuming the transducer system is malfunctioning if the output signal is not within the operational range. The electrostatic force can be applied to the proof mass using a charge control method. Applying an electrostatic force to the proof mass of the capacitive sensor can include a first actuation phase for resetting the capacitive sensor by removing charge from the first and second variable capacitors, and a second actuation phase for applying the electrostatic force to the first variable capacitor, the electrostatic force being a function of the duration of the second actuation phase. The second actuation phase follows the first actuation phase. Reading an output signal of the transducer system can include a first measurement phase for reading out the output signal of the transducer due to the electrostatic force, and a second measurement phase for applying no electrostatic force to the capacitive sensor. The second measurement phase follows the first measurement phase. The measurement phases follow the actuation phases.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
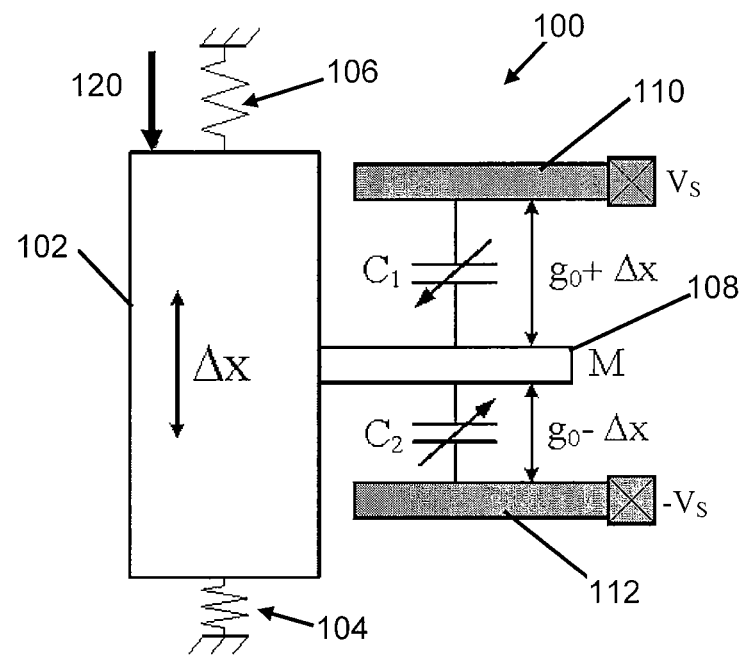
FIG. 1 illustrates an exemplary embodiment of a mechanical sensing element of a capacitive transducer.
Figure 2:
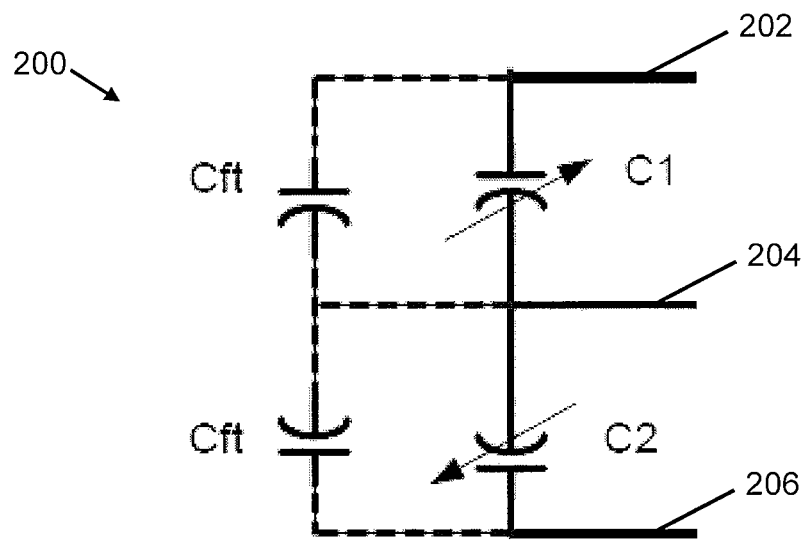
FIG. 2 illustrates the feed-through capacitance in a capacitive core.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF EXEMPLARY EMBODIMENTS

Figure 3:
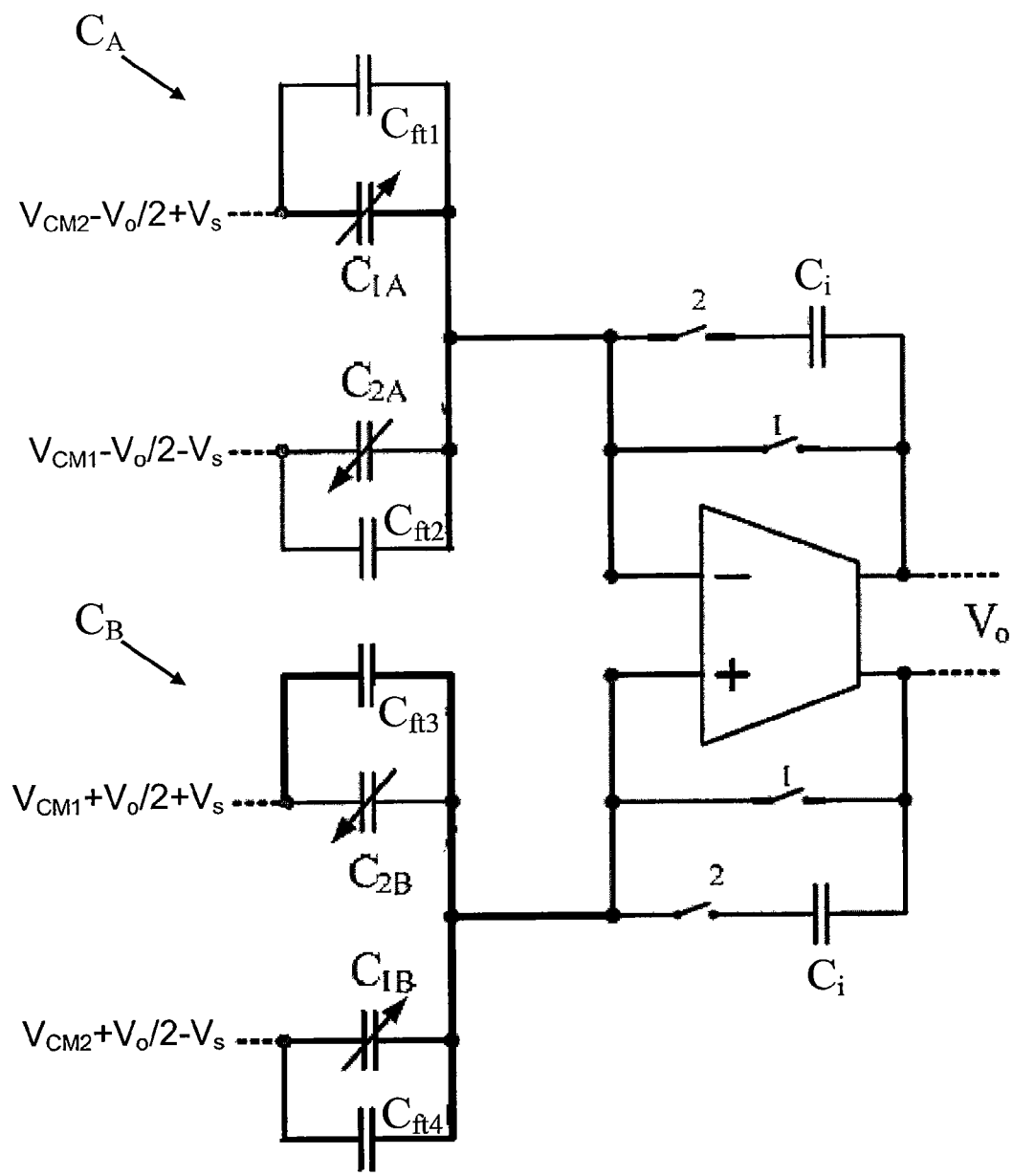
FIG. 3 illustrates an exemplary differential capacitive transducer circuit with feed-through capacitance.
Figure 4:
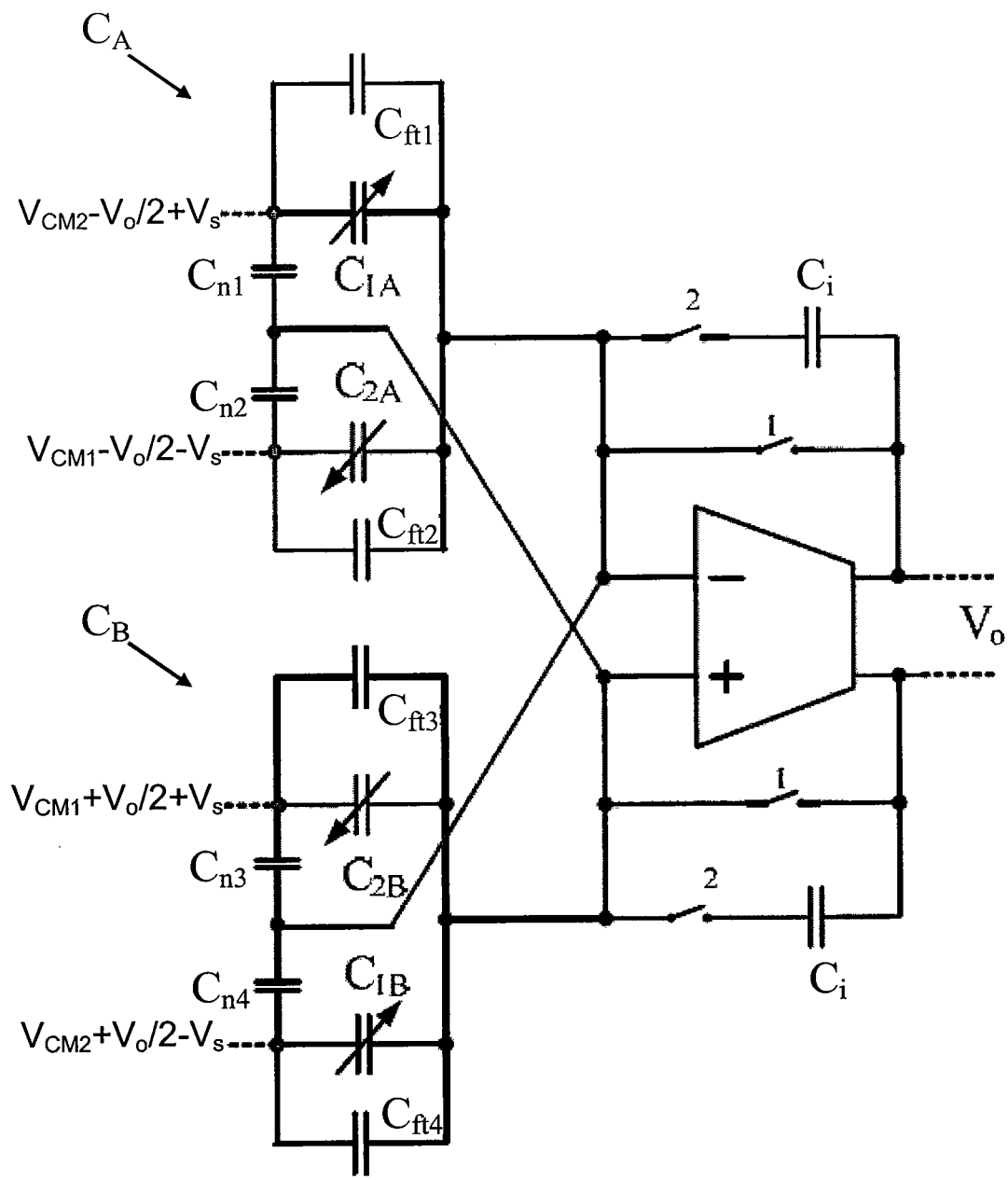
FIG. 4 illustrates the exemplary differential circuit of FIG. 3 with on-chip neutralization capacitors added to cancel the unwanted feed-through capacitances.

Capacitance neutralization is a procedure used in differential circuits to cancel unwanted parasitic capacitances by adding neutralization capacitances of opposite polarity using the differential voltages. FIG. 3 illustrates an exemplary differential circuit that includes a first capacitive core $C_A$ and a second capacitive core $C_B$. The first capacitive core $C_A$ includes variable capacitors $C_{1A}$ and $C_{2A}$. The second capacitive core $C_B$ includes variable capacitors $C_{1B}$ and $C_{2B}$. FIG. 3 also shows the unwanted feed-through capacitances $C_{ft1}$, $C_{ft2}$, $C_{ft3}$, $C_{ft4}$ that are parallel to the desired sense capacitors $C_{1A}$, $C_{2A}$, $C_{1B}$, $C_{2B}$, respectively. FIG. 4 illustrates the exemplary differential circuit of FIG. 3 with on-chip neutralization capacitors added to cancel the unwanted feed-through capacitances. The neutralization capacitors $C_{n1}$, $C_n2$, $C_{n3}$, $C_{n4}$ are added in a way to cancel the unwanted feed-through capacitances $C_{ft1}$, $C_{ft2}$, $C_{ft3}$, $C_{ft4}$, respectively.

Figure 5:
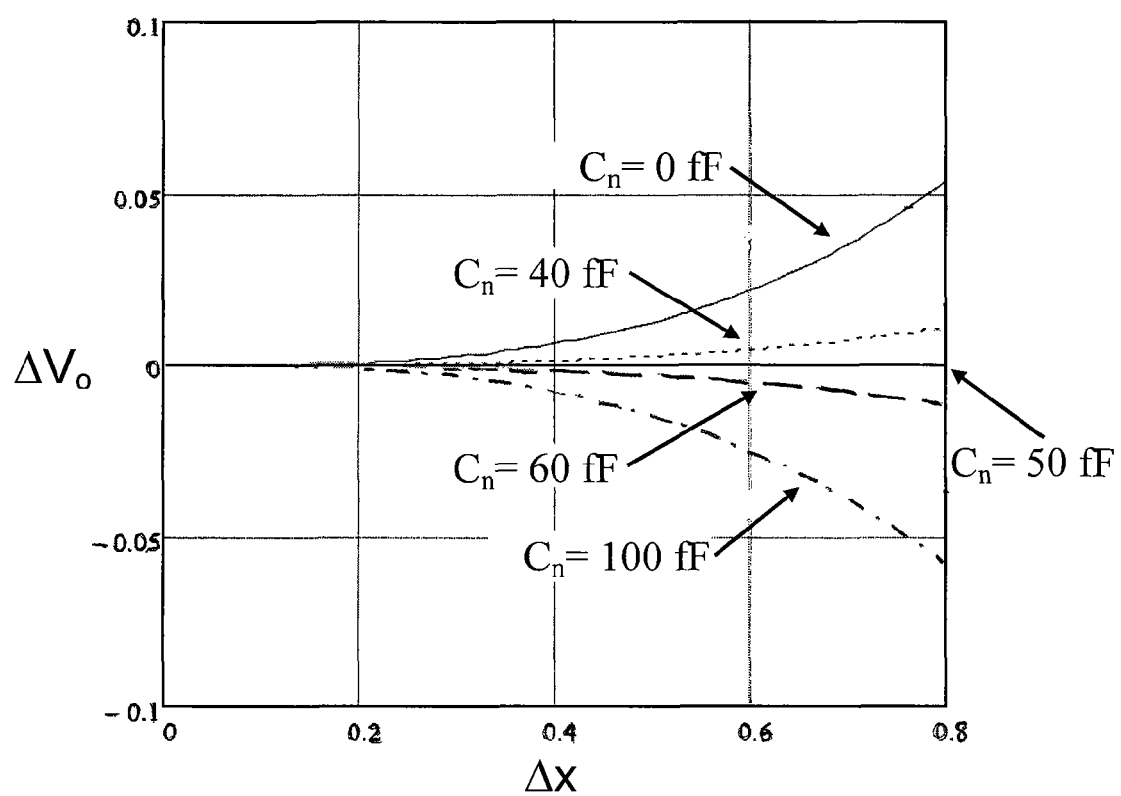
FIG. 5 is an exemplary graph illustrating the impact of adding too little or too much neutralization capacitance for a feed-through capacitance are 50 fF.

FIG. 5 illustrates the impact of adding too little or too much neutralization capacitance in a case where the feed-through capacitances are 50 fF. If we have the ideal case where the neutralization capacitors perfectly cancel the feed-through capacitances, then the measurement voltage Vo is proportional to the displacement x of the proof mass as shown in Eq. (2). If the neutralization capacitance is less than the feed-through capacitance ($C_n$=0 fF or $C_n$=40 fF), then the feed-through capacitances are not completely canceled and the measurement voltage Vo is greater than it would be in the ideal case. If the neutralization capacitance is greater than the feed-through capacitance ($C_n$=60 fF or $C_n$=100 fF), then the feed-through capacitance is canceled and we have excess neutralization capacitance which causes the measurement voltage Vo to be less than it would be in the ideal case. FIG. 5 also shows that the deviation of the measurement voltage ΔVo from ideal case increases as the displacement of the proof mass Δx increases. Thus, it is desirable to determine the necessary amount of neutralization capacitance to add to cancel the feed-through capacitance without adding excess neutralization capacitance.

One method is simply to estimate the mean feed-through capacitance for several parts and put in a nominal neutralization capacitance to cancel the mean feed-through capacitance. However both the feed-through and neutralization capacitances vary from part to part due to process variation and mismatch which leads to improper cancellation. This method can be relatively inexpensive and provides some benefit but is not necessarily accurate for a particular part.

A more accurate but expensive method to cancel the feed-through capacitance is to put each chip inside a centrifuge. Then as the acceleration is increased using the centrifuge, the output voltage can be read for various on-chip neutralization capacitor settings. The on-chip neutralization capacitance can be set using trim bits. The neutralization capacitance that corresponds to the most linear output measurement versus acceleration curve can then be programmed into the chip.

This procedure is expensive in terms of test cost and time since it requires use of a centrifuge and time to load the chips and sweep the measurement versus acceleration curves for each of the chips.

An alternative method for determining the necessary amount of neutralization capacitance is to measure the linearity of the measured output for two or more precisely known forces. A force F0 and twice that force, 2*F0, can be applied to the proof mass and the change in the output can be measured to determine the linearity between the input forces and the output measurements. FIG. 6 shows three scenarios for this method when the forces F0 and 2*F0 are applied. Other ratios of forces or more forces can be used as long as the relationships between the forces are known.

Figure 6A:
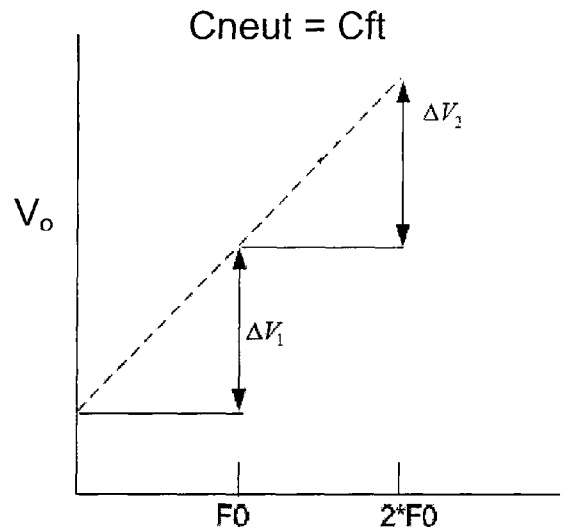
FIG. 6A shows the linearity of the output voltage when forces of F0 and 2*F0 are applied to a sensor when the neutralization capacitance perfectly cancels the feed-through capacitance.
Figure 6B:
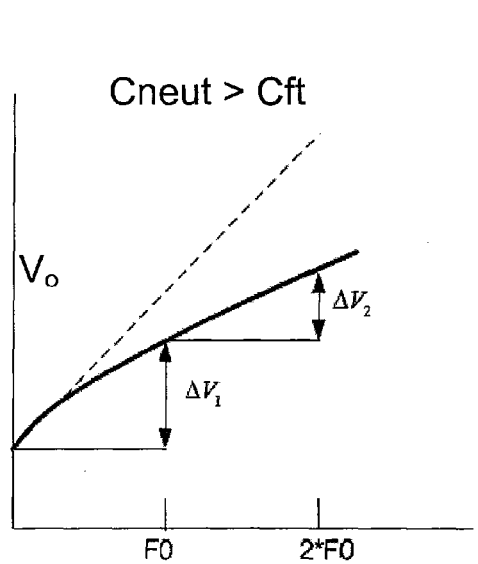
FIG. 6B shows the non-linearity of the output voltage when forces of F0 and 2*F0 are applied to a sensor when the neutralization capacitance is greater than the feed-through capacitance.
Figure 6C:
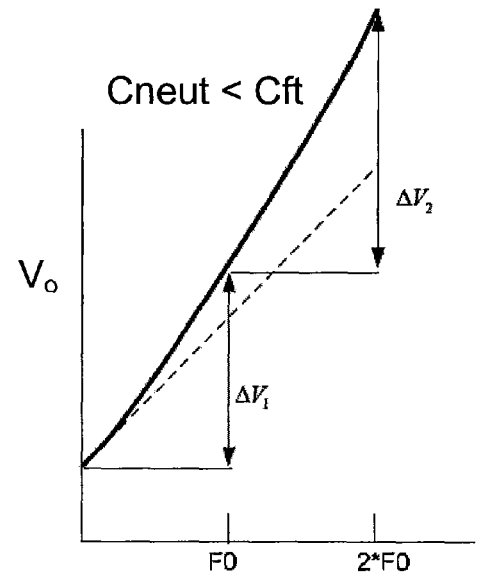
FIG. 6C shows the non-linearity of the output voltage when forces of F0 and 2*F0 are applied to a sensor when the neutralization capacitance is less than the feed-through capacitance.

FIG. 6A shows the ideal situation where the neutralization capacitance perfectly cancels the feed-through capacitance, $C_n=C_{ft}$. In this case, the change in output voltage $\Delta V_1$ caused by the force F0 equals the change in output voltage $\Delta V_2$ caused by the force 2*F0 which produces a linear relationship between displacement and output voltage. FIG. 6B shows the situation where too much neutralization capacitance is added, $C_n>C_{ft}$. In this case, the change in output voltage $\Delta V_1$ caused by the force F0 is greater than the change in output voltage $\Delta V_2$ caused by the force 2*F0 which produces a decreasing non-linear relationship between displacement and output voltage. FIG. 6C shows the situation where too little neutralization capacitance is added, $C_n<C_{ft}$. In this case, the change in output voltage $\Delta V_1$ caused by the force F0 is less than the change in output voltage $\Delta V_2$ caused by the force 2*F0 which produces an increasing non-linear relationship between displacement and output voltage. It can be seen from FIGS. 6A-6C that if the relationship between the applied forces is known, then the non-linearity of the resulting output measurements will indicate whether the neutralization capacitance should be increased or decreased to better model the linearity of the ideal case. A force can be applied to the proof mass using electrostatic actuation.

Figure 7:
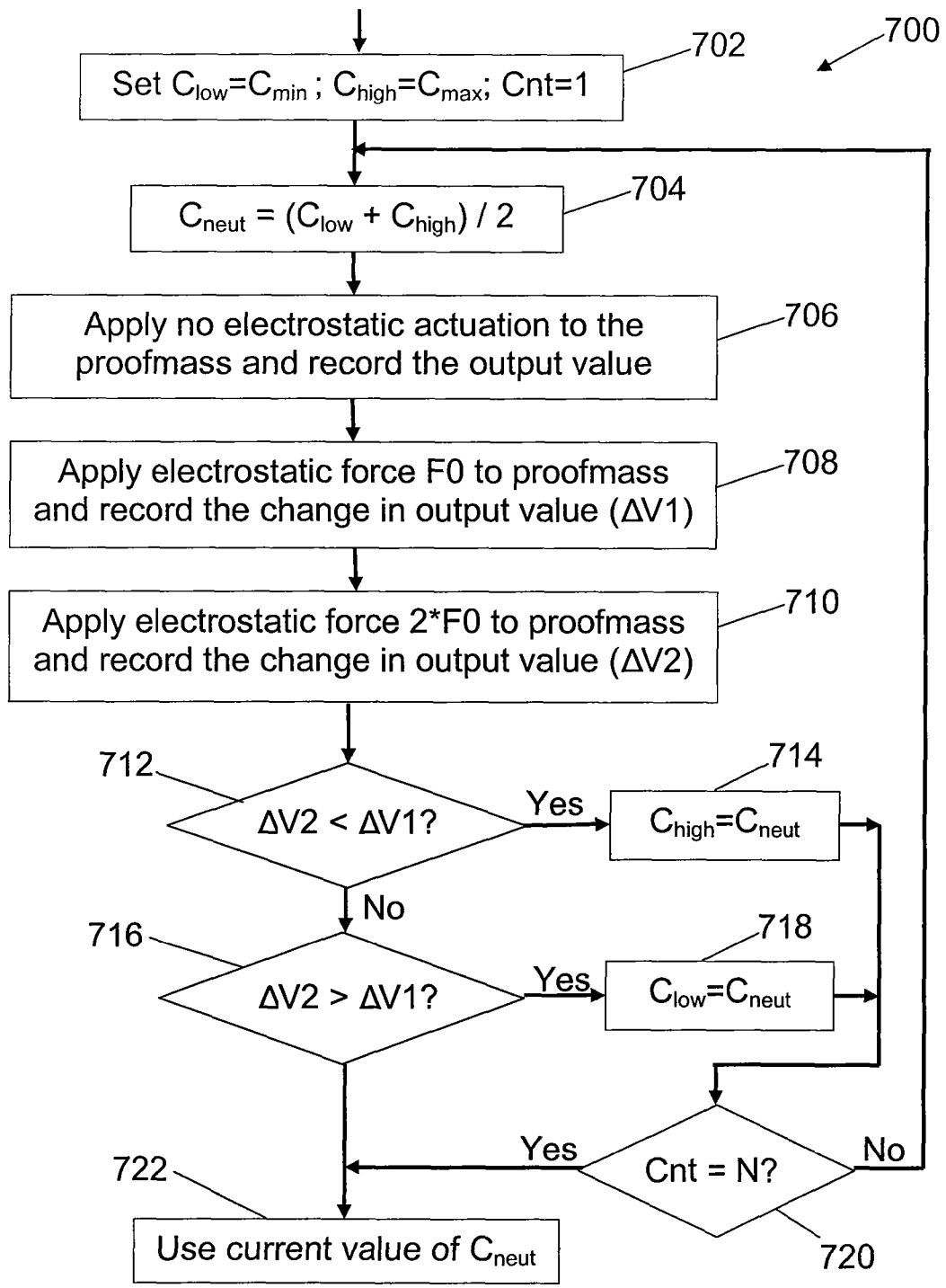
FIG. 7 shows an exemplary flow diagram for an automatic calibration procedure for tuning out the feed-through capacitance using on-chip neutralization capacitance.

FIG. 7 shows an exemplary automatic calibration procedure 700 for tuning out the feed-through capacitance using on-chip neutralization capacitance, $C_{neut}$. The calibration procedure 700 uses a binary search method between a lower limit for on-chip neutralization capacitance, $C_{min}$, and an upper limit for on-chip neutralization capacitance, $C_{max}$. Other search schemes known in the art can also be used for finding a value of neutralization capacitance to cancel the feed-through capacitance.

At block 702, the process is initialized by setting the lower binary search limit to the lower limit for on-chip neutralization capacitance, $C_{low}=C_{min}$, setting the upper binary search limit to the upper limit for on-chip neutralization capacitance, $C_{high}=C_{max}$, and setting the search counter to 1.

At block 704, the system sets the value of neutralization capacitance to be checked, $C_{neut}$, to the center of the working binary search range $(C_{low}+C_{high})/2$. At block 706, no electrostatic actuation is applied to the proof mass and the output value is recorded. This output will include the sensor offset and a fraction of earth's gravitational force depending on the angle of mounting of the proof mass. At block 708, an electrostatic force of F0 is applied to the proof mass and the change in the output value ($\Delta V1$) is recorded. At block 710, an electrostatic force of 2*F0 is applied to the proof mass and the change in the output value ($\Delta V2$) is recorded. Under some conditions, a force of 2*F0 can be applied by making the duty cycle of actuation twice as long as the duty cycle for the force of F0. Other multiples of F0 can also be used to determine linearity. The method then determines whether the neutralization capacitance should be increased or decreased to better cancel the feed-through capacitance. These steps can be implemented by increasing and decreasing a trim setting for neutralization capacitance.

At block 712, the system tests whether $\Delta V2$ is less than $\Delta V1$. In this case there is too much neutralization capacitance compared to the feed-through capacitance. If $\Delta V2$ is less than $\Delta V1$ then control passes to block 714, otherwise control passes to block 716. At block 714, the system decreases the neutralization capacitance by setting the upper limit for the binary search to the current value, $C_{high}=C_{neut}$, and control passes to block 720.

At block 716, the system tests whether $\Delta V2$ is greater than $\Delta V1$. In this case there is less neutralization capacitance as compared to the feed-through capacitance. If $\Delta V2$ is greater than $\Delta V1$ then control passes to block 718, otherwise control passes to block 722. At block 718, the system increases the neutralization capacitance by setting the lower limit for the binary search to the current value, $C_{low}=C_{neut}$, and control passes to block 720.

At block 720, the system checks whether the binary search is complete by checking if the binary search counter equals N. Larger values of N indicate finer resolution in determining the neutralization capacitance that cancels the feed-through capacitance, which should provide more accurate cancellation. If the binary search is not complete (Cnt<N), then control passes back to block 704 and the output readings are taken for a new value of neutralization capacitance. If the binary search is complete (Cnt=N), then control passes to block 722.

Block 722 is reached because either: (a) the system determined that $\Delta V2$ is not less than or greater than $\Delta V1$, which leaves that $\Delta V2$ equals $\Delta V1$; or (b) the binary search is complete. In either case the final value of neutralization capacitance $C_{neut}$ will be used.

The system can also include a threshold linearity check to ensure that the selected value of neutralization capacitance $C_{neut}$ meets the threshold. For example, the threshold check can determine whether the absolute value of the difference between $\Delta V2$ and $\Delta V1$ is less than the threshold linearity for the final value of neutralization capacitance $C_{neut}$.

Figure 8:
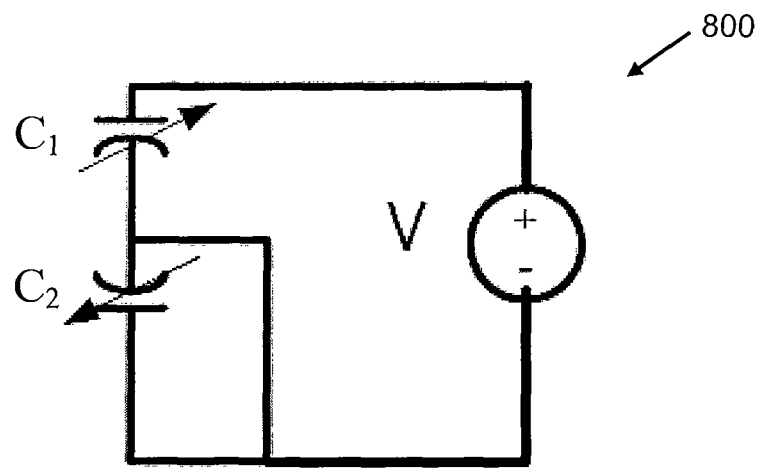
FIG. 8 shows an exemplary voltage actuation circuit.

One way of applying electrostatic force for sensor calibration is by voltage actuation. FIG. 8 shows an exemplary voltage actuation circuit 800. Under voltage actuation, a fixed voltage V is applied to sensor capacitor $C_1$ while sensor capacitor $C_2$ is shorted. The relationship between the applied electrostatic force $F_e$ and the mechanical force $F_m$ can be expressed as:

$$F_e = \frac{1}{2}\frac{dC}{dx}V^2 * \text{duty\_cycle} = kx = F_m \qquad (4)$$

Solving for the electrostatic force term provides:

$$\frac{1}{2}\frac{C_0 d_0}{(d_0-x)^2}V^2 * \text{duty\_cycle} = kx \qquad (5)$$

Eq. (5) shows that for voltage actuation, the displacement x is not a linear function of duty cycle, i.e. doubling the duty cycle of actuation does not result in doubling the displacement of the proof mass. Thus, this method of voltage actuation does not provide the desired linear actuation as a function of duty cycle.

Figure 9:
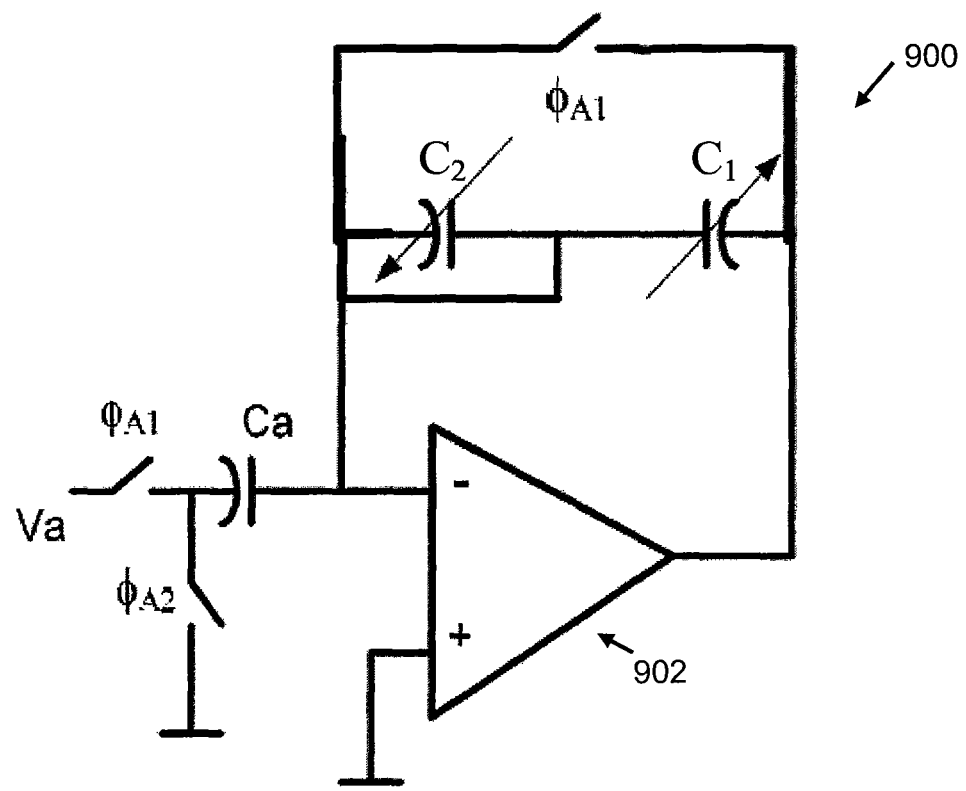
FIG. 9 shows an exemplary charge control actuation circuit.

Another way of applying electrostatic force for sensor calibration is by charge control actuation. FIG. 9 shows an exemplary charge control actuation circuit 900 comprising a sensor core with variable sensor capacitors $C_1$ and $C_2$, an amplifier 902, a capacitor Ca and an input voltage source Va. Under charge control actuation, the sensor core is placed in a first feedback path of the amplifier 902, and the sensor capacitor $C_2$ is shorted so that charge is placed on only the sensor capacitor $C_1$ of the sensor core. The amplifier 902 also includes a second parallel feedback path with a switch that is open during a phase $\Phi_{A1}$. During phase $\Phi_{A1}$, the sensor core is reset and a constant charge Va is gathered on capacitor Ca. Then during phase $\Phi_{A2}$, the charge is dumped from capacitor Ca onto the sensor capacitor $C_1$. In this case, the relationship between the applied electrostatic force $F_e$ and the mechanical force $F_m$ can be expressed as:

$$F_e = \frac{Q_0^2}{2} \frac{d}{dx}\left(\frac{-1}{C}\right) * \text{duty\_cycle} = kx = F_m \quad (6)$$

Solving for the electrostatic force term provides:

$$\frac{Q_0^2}{2}\left(\frac{1}{C_0 d_0}\right) * \text{duty\_cycle} = kx \quad (7)$$

Eq. (7) shows that for charge control actuation, the displacement x is a linear function of duty cycle, i.e. doubling the duty cycle of actuation results in doubling the displacement of the proof mass. This method of charge control actuation appears to provide the desired linear actuation as a function of duty cycle.

Figure 10:
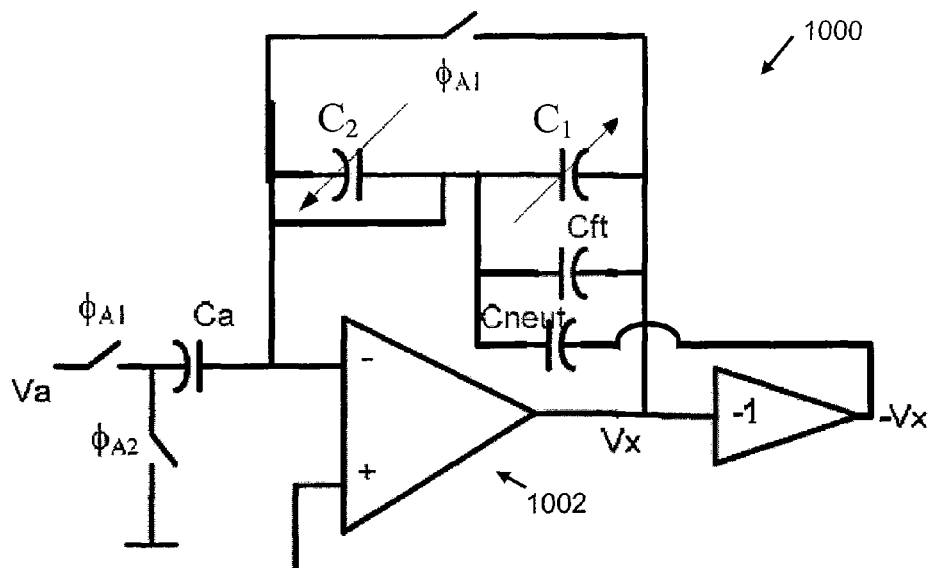
FIG. 10 shows an exemplary charge control actuation circuit with feed-through and neutralization capacitances.

The above analysis shows charge control actuation without the feed-through capacitances. FIG. 10 shows an exemplary charge control actuation circuit 1000 with the feed-through and neutralization capacitances. Unfortunately, when the feed-through capacitance Cft is included, the charge $Q_0$ is not only dumped on capacitor C1 but is also dumped on capacitor Cft, and the charge is not linearly split between capacitors C1 and Cft based on the displacement, x. A similar neutralization principle can be used for the charge control circuit 1000. Ideally, if Cft=Cneut then there is perfect cancellation and the charge control is perfectly linear. However, if Cft≠Cneut then there is non-linearity. Fortunately, this cancellation non-linearity is in the same direction as the feed-through nonlinearity due to the feed-through capacitance, Cft. Therefore, this cancellation non-linearity can actually help with neutralization because if there is an error in Cft cancellation, this cancellation error makes that feed-through error appear larger, and when Cft=Cneut there is no cancellation or feed-through error.

Figure 11:
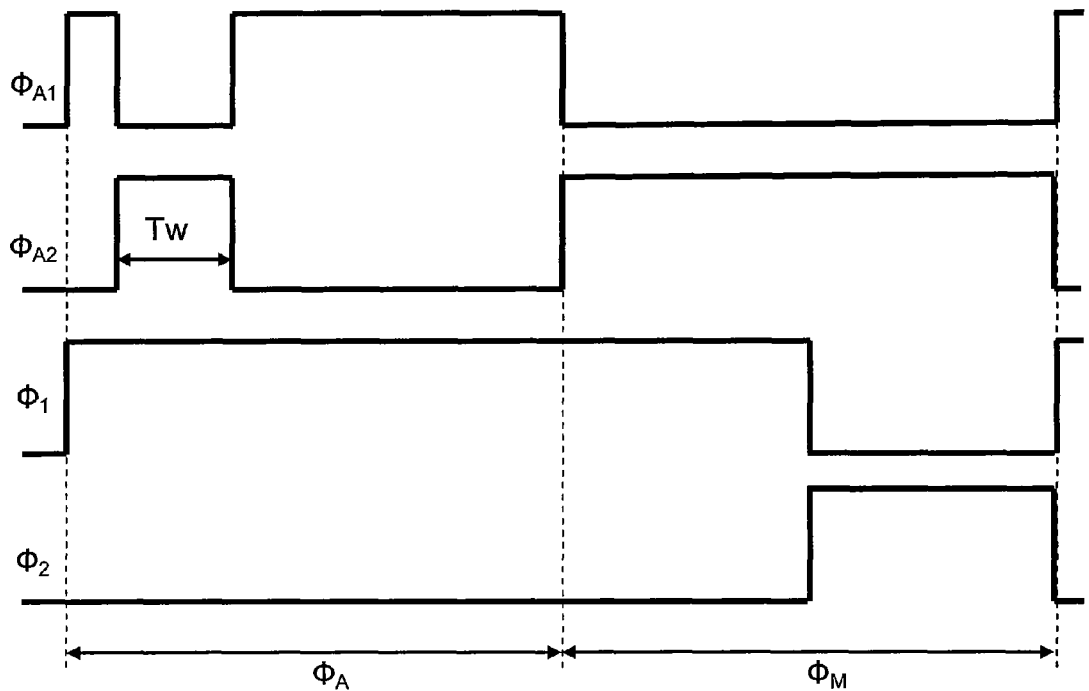
FIG. 11 shows exemplary timing diagrams for an auto-calibration procedure.
Figure 12:
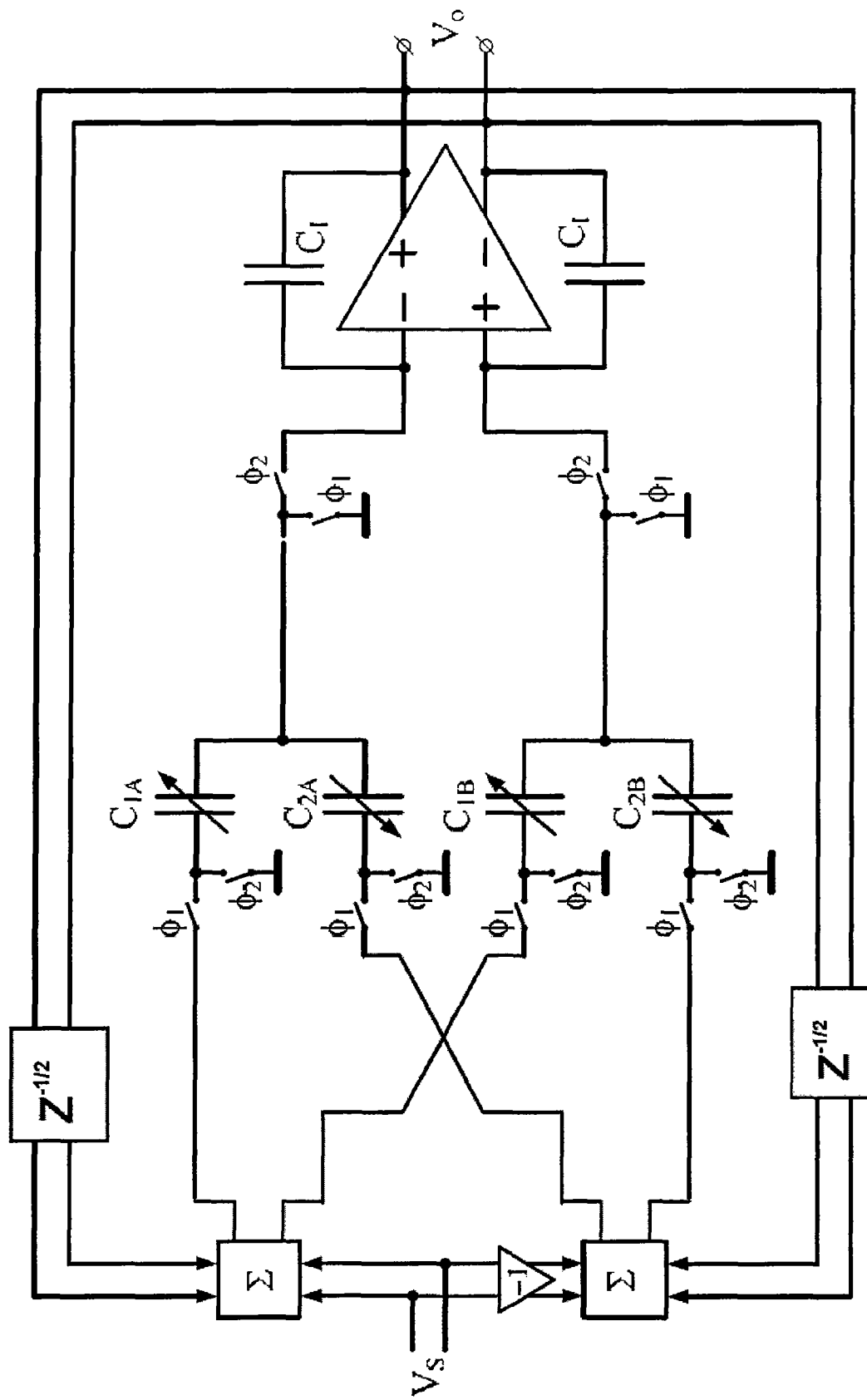
FIG. 12 shows an exemplary differential capacitive sensor system.

Exemplary timing diagrams for an auto-calibration procedure are shown in FIG. 11. An exemplary differential capacitive sensor system is shown in FIG. 12. During auto calibration, time is divided between actuation phases $\Phi_A$ and measurement phases $\Phi_M$. The circuit of FIG. 10 is referred to during the actuation phase description, and the circuit of FIG. 12 is referred to during the measurement phase description. The circuit of FIG. 10 is not shown in the circuit of FIG. 12 for clarity. Those of skill in the art will understand that there will be other switches in series with the sensor switches that enable actuation. These switches are not shown in FIG. 12. FIG. 12 only shows the circuit during the measurement phase. Drawing all of the switches would make FIG. 12 extremely complicated. Thus, FIG. 12 shows the sensor and the capacitance-to-voltage circuit during the measurement phase, and FIG. 10 shows the sensor and actuation circuits during the actuation phase. Some of the details regarding the switches that connect the sensor to the actuation amplifier 1002 or the capacitance-to-voltage amplifier are not shown, for example the sensor is disconnected from the capacitor Ca during the measurement phase.

During the actuation phase, the sensor is connected as shown in FIG. 10. For a differential sensor system, each of the capacitor cores $C_A$ and $C_B$ are connected as shown in FIG. 10. The actuation phase $\Phi_A$ is further divided into two subphases: $\Phi_{A1}$ and $\Phi_{A2}$. During the actuation phase, the sensor is disconnected from the front end, so $\Phi_2$ equals 0. During subphase $\Phi_{A1}$, the sensor is reset and a constant charge is gathered on capacitor Ca. Then during subphase $\Phi_{A2}$, the charge is dumped onto the MEMS capacitor $C_1$. The actuation force is linearly proportional to Tw, the duration or duty cycle of the actuation subphase $\Phi_{A2}$. Then $\Phi_{A1}$ is high during the last part of the actuation phase to reset the capacitors to provide zero force and get them ready for the measurement phase. In a differential system, the actuation force can be applied to both cores at substantially simultaneously to simulate the application of a force in operation.

During the measurement phase, the sensor is connected as shown in FIG. 12. The measurement phase $\Phi_M$ is divided into two subphases: $\Phi_1$ and $\Phi_2$. During the first subphase $\Phi_1$, the MEMS capacitors are connected to the front end of the capacitive sensor system and the displacement is read out by the system as a voltage $V_0$. During the second subphase $\Phi_2$, the voltages are applied to the sensor so that there is no net electrostatic force on the proof masses of the cores $C_A$ and $C_B$ to cause erroneous actuation.

By alternating between the actuation and measurement phases, at a very high speed (for example, 100 kHz), an accurate, low noise measurement can be made.

Charge control actuation has not previously been reported for linear actuation. Charge-control can be used for linear actuation to obtain immunity to unwanted vibrations that cause the proof mass of the sensor to shake around.

Continuous self-test is a technique to check that a sensor continues to function properly during operation. In continuous self test, a background signal (force) is applied continuously on the sensor. This background signal is usually a pseudo-random signal, for example a square wave or a sine wave. By measuring the displacement of the proof mass, an output signal caused by this background signal can be read out by the transducer system. If the output signal is within some operational limits of what is expected for the background signal, then it can be assumed that the sensor is working properly. If the output signal is beyond some warning limits, then it can be assumed that the sensor is malfunctioning and it cannot be used to make safety-critical decisions. In an automotive application, an example of a safety critical decision would be detecting a skid and applying brakes selectively on the wheels according to the sensor signals.

Linear actuation can be important in a self-test application. For example, in a car there are many vibrations that are several tens of gravitational force (g) that are within the sensor bandwidth. An exemplary sensor bandwidth for an accelerometer is usually less than 5 kHz. These multi-g vibrations can cause the proof mass to shake around. If the actuation of the proof mass during self test is non-linear (i.e. the actuation force depends on the proof mass displacement), these vibrations can mix with the actuation signal and change the DC value for the sensor making the subsequent readings inaccurate. An example of non-linear actuation is the voltage actuation shown in Eq. (5). The electrostatic force due to voltage actuation is a function of the proof mass displacement squared $x^2$, so these vibrations causing the proof mass to shake around during self test can cause inaccurate results.

Linear actuation can avoid this change to the DC value for the sensor during continuous self-test. An example of linear actuation is the charge-control actuation shown in Eq. (7). The electrostatic force due to charge-control actuation is not a function of the proof mass displacement x. So vibrations causing the proof mass to shake around during self test do not effect the self-test. Thus the self-test can provide accurate results during operation even if there are multi-g vibrations on the sensor.

While this invention has been described as having an exemplary design, the present invention may be further modified within the spirit and scope of this disclosure. This application is therefore intended to cover any variations, uses, or adaptations of the invention using its general principles.

We claim:

1. A method for automatically calibrating a capacitive transducer to neutralize feed-through capacitance using a neutralization capacitance, the method comprising:
    initializing a current neutralization capacitance to an initial neutralization capacitance;
    determining linearity of relationship between electrostatic forces applied to a proof mass of the capacitive transducer and resulting output values of the capacitive transducer, the determination of the linearity of relationship including:
        applying a first electrostatic force to the proof mass of the capacitive transducer;
        reading a first output value of the capacitive transducer when the first electrostatic force is applied to the proof mass;
        applying a second electrostatic force to the proof mass of the capacitive transducer;
        reading a second output value of the capacitive transducer when the second electrostatic force is applied to the proof mass;
        applying a third electrostatic force to the proof mass of the capacitive transducer;
        reading a third output value of the capacitive transducer when the third electrostatic force is applied to the proof mass; and
        using the first, second and third electrostatic forces and the first, second and third output values to determine the linearity of the relationship between the electrostatic forces applied to the proof mass of the capacitive transducer and the resulting output values of the capacitive transducer;
    updating the current neutralization capacitance to improve the linearity of the relationship between the electrostatic forces applied to the proof mass of the capacitive transducer and the resulting output values of the capacitive transducer; and
    repeating the determining and updating steps until a completion criteria is satisfied.

2. The method of claim 1, wherein the first electrostatic force is no electrostatic force.

3. The method of claim 1, wherein the third electrostatic force is N times the second electrostatic force.

4. The method of claim 3, wherein the electrostatic forces are applied to the proof mass using a charge control method.

5. The method of claim 4, wherein applying the second electrostatic force to the proof mass comprises actuating the proof mass for a period t; and
    wherein applying the third electrostatic force to the proof mass comprises actuating the proof mass for a period N*t.

6. The method of claim 5, wherein a low neutralization capacitance is initially set to a minimum neutralization capacitance, a high neutralization capacitance is initially set to a maximum neutralization capacitance, and the initial neutralization capacitance is the average of the minimum and maximum neutralization capacitances;
    wherein the first electrostatic force is no electrostatic force; and
    wherein updating the current neutralization capacitance to improve the linearity of the relationship between the electrostatic forces applied to the proof mass of the capacitive transducer and the resulting output values of the capacitive transducer comprises:
        when the difference between the second and first output values is greater than the difference between the third and second output values divided by (N−1), setting the high neutralization capacitance to the current neutralization capacitance and then updating the current neutralization capacitance to the average of the high and low neutralization capacitances;
        when the difference between the second and first output values is less than the difference between the third and second output values divided by (N−1), setting the low neutralization capacitance to the current neutralization capacitance and then updating the current neutralization capacitance to the average of the high and low neutralization capacitances; and
        when the difference between the second and first output values is equal to the difference between the third and second output values divided by (N−1), maintaining the current, low and high neutralization capacitances.

7. The method of claim 6, wherein a first completion criteria is satisfied when the repetitions of the determining and updating steps exceeds a fixed value, and a second completion criteria is satisfied when the difference between the second and first output values is equal to the difference between the third and second output values divided by (N−1); a completion criteria being satisfied when either of the first and second completion criteria is satisfied.

8. The method of claim 4, wherein the capacitive transducer comprises first and second variable capacitors and applying a desired electrostatic force to the proof mass of the capacitive transducer comprises:
    resetting the capacitive transducer during a first actuation phase by removing charge from the first and second variable capacitors;
    applying the desired electrostatic force to the capacitive transducer during a second actuation phase, the desired electrostatic force being a function of the duration of the second actuation phase, the second actuation phase following the first actuation phase;
    short circuiting the second variable capacitor of the capacitive transducer during the second actuation phase
    reading the resulting output value of the capacitive transducer due to the desired electrostatic force during a first measurement phase, the first measurement phase following the second actuation phase; and
    applying no electrostatic force to the first and second variable capacitors during a second measurement phase, the second measurement phase following the first measurement phase.

9. The method of claim 1, wherein using the first, second and third electrostatic forces and the first, second and third output values to determine the linearity of the relationship between the electrostatic forces applied to the proof mass of the capacitive transducer and the resulting output values of the capacitive transducer comprises:

computing a slope of a first line between a first point defined by the first electrostatic force and the first output value and a second point defined by the second electrostatic force and the second output value;

computing a slope of a second line between the second point and a third point defined by the third electrostatic force and the third output value; and comparing the slope of the first line with the slope of the second line.

10. The method of claim 9, wherein updating the current neutralization capacitance to improve the linearity of the relationship between the electrostatic forces applied to the proof mass of the capacitive transducer and the resulting output values of the capacitive transducer comprises:

decreasing the current neutralization capacitance when the slope of the first line is greater than the slope of the second line;

increasing the current neutralization capacitance when the slope of the first line is less than the slope of the second line; and maintaining the current neutralization capacitance when the slope of the first line is equal to the slope of the second line.

11. The method of claim 10, wherein the neutralization capacitance is tunable between a minimum neutralization capacitance and a maximum neutralization capacitance; and the initial neutralization capacitance is the average of the minimum and maximum neutralization capacitances; the method further comprising:

initially setting a low neutralization capacitance to the minimum neutralization capacitance;

initially setting a high neutralization capacitance to the maximum neutralization capacitance; and wherein decreasing the current neutralization capacitance comprises setting the high neutralization capacitance to the current neutralization capacitance, and then updating the current neutralization capacitance to the average of the high and low neutralization capacitances; and increasing the current neutralization capacitance comprises setting the low neutralization capacitance to the current neutralization capacitance, and then updating the current neutralization capacitance to the average of the high and low neutralization capacitances.

12. The method of claim 10, wherein a first completion criteria is satisfied when the repetitions of the determining and updating steps exceeds a fixed value, and a second completion criteria is satisfied when the difference between the slope of the first line and the slope of the second line is less than a linearity threshold; a completion criteria being satisfied when either of the first and second completion criteria is satisfied.

13. The method of claim 1, wherein a low neutralization capacitance is initially set to a minimum neutralization capacitance, a high neutralization capacitance is initially set to a maximum neutralization capacitance, and the initial neutralization capacitance is the average of the minimum and maximum neutralization capacitances;

wherein the first electrostatic force is no electrostatic force, and the third electrostatic force is twice the second electrostatic force; and wherein updating the current neutralization capacitance to improve the linearity of the relationship between the electrostatic forces applied to the proof mass of the capacitive transducer and the resulting output values of the capacitive transducer comprises:

when the difference between the second and first output values is greater than the difference between the third and second output values, setting the high neutralization capacitance to the current neutralization capacitance and then updating the current neutralization capacitance to the average of the high and low neutralization capacitances;

when the difference between the second and first output values is less than the difference between the third and second output values, setting the low neutralization capacitance to the current neutralization capacitance and then updating the current neutralization capacitance to the average of the high and low neutralization capacitances; and when the difference between the second and first output values is equal to the difference between the third and second output values, maintaining the current, low and high neutralization capacitances.

14. The method of claim 13, wherein a first completion criteria is satisfied when the repetitions of the determining and updating steps exceeds a fixed value, and a second completion criteria is satisfied when the difference between the second and first output values is equal to the difference between the third and second output values; a completion criteria being satisfied when either of the first and second completion criteria is satisfied.

15. The method of claim 14, wherein the electrostatic forces are applied to the proof mass using a charge control method.

16. The method of claim 15, wherein applying the second electrostatic force to the proof mass comprises actuating the proof mass for a period t; and wherein applying the third electrostatic force to the proof mass comprises actuating the proof mass for a period 2*t.

17. The method of claim 16, wherein the capacitive transducer comprises first and second variable capacitors and applying a desired electrostatic force to the proof mass of the capacitive transducer comprises:

resetting the capacitive transducer during a first actuation phase by removing charge from the first and second variable capacitors;

applying the desired electrostatic force to the capacitive transducer during a second actuation phase, the desired electrostatic force being a function of the duration of the second actuation phase, the second actuation phase following the first actuation phase;

short circuiting the second variable capacitor of the capacitive transducer during the second actuation phase;

reading the resulting output value of the capacitive transducer due to the desired electrostatic force during a first measurement phase, the first measurement phase following the second actuation phase; and applying no electrostatic force to the first and second variable capacitors during a second measurement phase, the second measurement phase following the first measurement phase.

18. The method of claim 1, wherein a first completion criteria is satisfied when the linearity of the relationship between the electrostatic forces applied to the proof mass of the capacitive transducer and the resulting output values of the capacitive transducer is within a linearity threshold, and a second completion criteria is satisfied when the repetitions of the determining and updating steps exceeds a fixed value; a completion criteria being satisfied when either of the first and second completion criteria is satisfied.

19. The method of claim 18, further comprising:

comparing the linearity of the relationship between the electrostatic forces applied to the proof mass of the capacitive transducer and the resulting output values of the capacitive transducer with the final current neutralization capacitance to a linearity threshold.

* * * * *